United States Patent [19]

Cole

[11] Patent Number: 5,015,073
[45] Date of Patent: May 14, 1991

[54] OVER THE EYEPIECE POCKET FILTER CARD

[76] Inventor: Richard D. Cole, 311 Oleander Dr., San Jacinto, Calif. 92383

[21] Appl. No.: 261,015

[22] Filed: Jan. 13, 1989

[51] Int. Cl.$^5$ .............................................. G02B 5/22
[52] U.S. Cl. ...................................... 350/317; 350/315
[58] Field of Search ............... 350/317, 318, 311, 315, 350/316, 314, 537, 580

[56] References Cited

U.S. PATENT DOCUMENTS

| | | | |
|---|---|---|---|
| 3,493,748 | 2/1970 | Tajima | 350/315 |
| 3,623,794 | 11/1971 | Brown | 350/316 |
| 3,820,878 | 6/1974 | Mueller | 350/317 |
| 3,856,418 | 12/1974 | Levine | 350/318 |

*Primary Examiner*—Bruce Y. Arnold
*Assistant Examiner*—Loha Ben

[57] ABSTRACT

This invention is a new innovative approach to filtered astronomical observation. The card consists of a pocket sized durable card containing the 8 most popular colored acetate filters used by amateur astronomers for planetary and celestial observations. Unlike conventional glass eyepiece filters, which requires that you remove the telescopes eyepiece to screw on a new filter for each color change, the pocket filter card has all 8 popular colors on one card, for immediate easy access without having to manipulate the telescopes eyepiece. There are many advantages to this over the eyepiece system in that it can be used on any size telescope and because the observer can so easily and quickly scan one colored filter to another, the observer can take advantage of enhanced imagery of all the colors observed due to his persistance of image imprinted in his mind. The card can be taken to any astronomical gathering and used over the eyepiece on any telescope on display without imposing on that telescope because manipulating the eyepiece to change colored filters is not necessary with the pocket filter card. The pocket filter card requires no expensive carrying case for storage, it is easily stored in a protective paper envelope which can be carried around in your pocket.

1 Claim, 1 Drawing Sheet

U.S. Patent  May 14, 1991  5,015,073
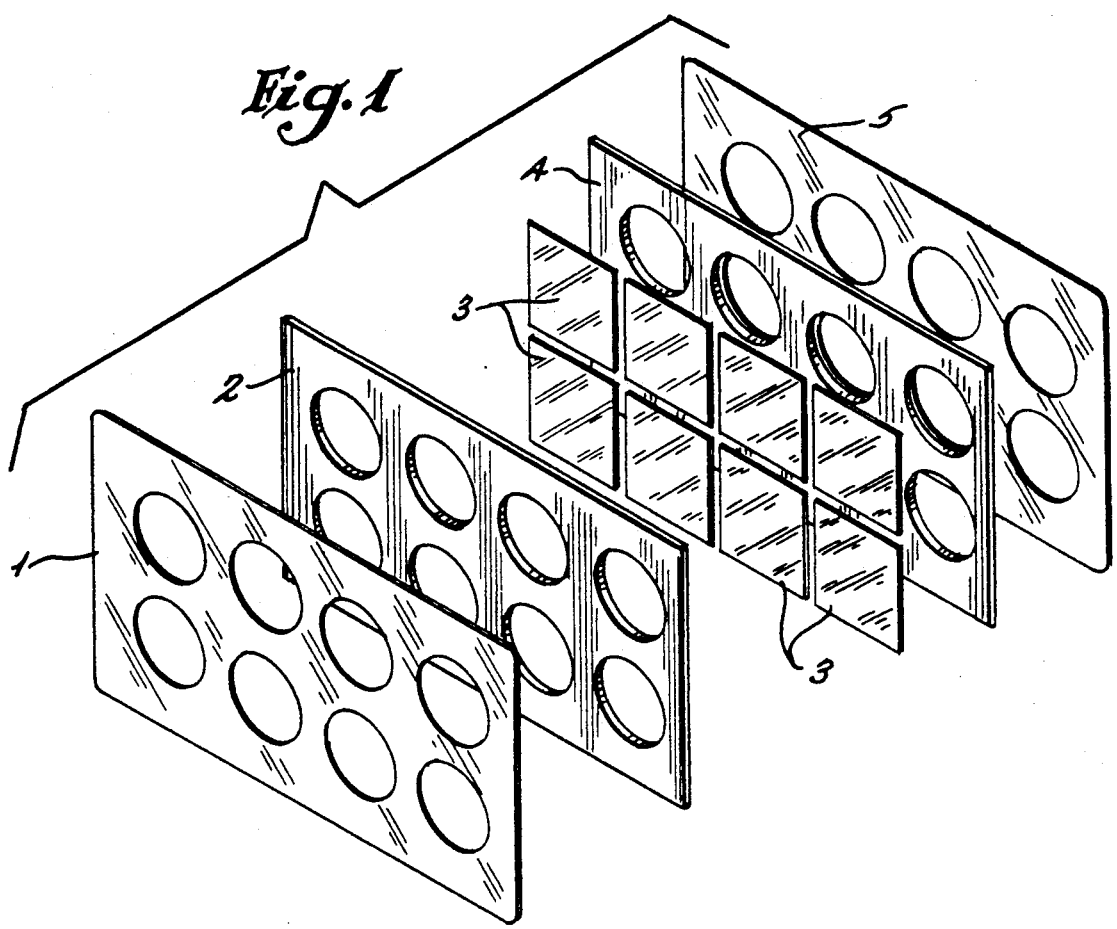
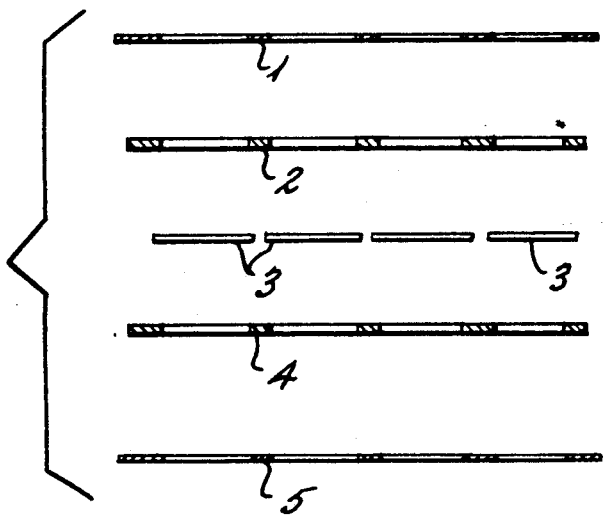
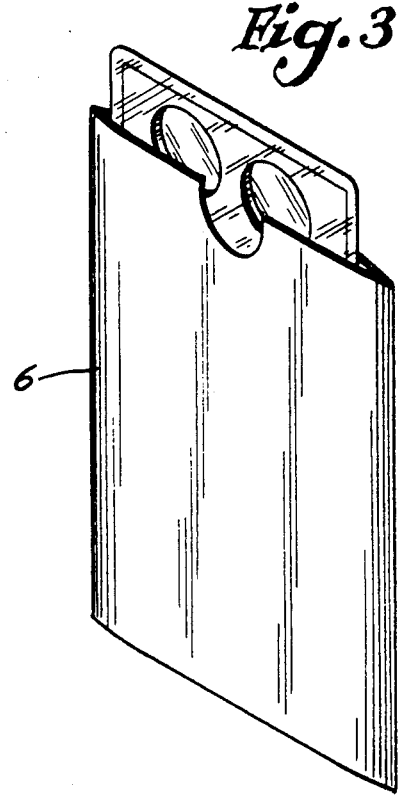

OVER THE EYEPIECE POCKET FILTER CARD

BACKGROUND OF THE INVENTION

A pocket sized filter card used for astronomical observations through any telescope. This card is an over-the-eye-piece filter system, for the use by the amateur astronomer to view celestial objects. The card is a 3 inches by 5 inches card with 8 colored acetate filters laminated within a face and back card by a transparent protective plastic sheeting, ¾ inch circular holes are cut through the card's laminated face and back cards to provide a distortion free viewport through the colored acetate filters.

The card is used by placing it between the observer's eyes and the telescope's eyepiece. In this manner the observer can select any color he or she chooses by just scanning the card over the eyepiece positioning the desired filter over the eyepiece, this color selection can be done without having to remove the telescope's eyepiece, as required with conventional glass eyepiece filters.

SUMMARY OF THE INVENTION

This is a laminated card having 3 inches by 5 inches in size. The card houses 8 colored acetate plastic film filters. The card consists of a face and back card, made of 67 lbs. card stock with eight ¾ inch circular holes pre-cut into them. The card is laminated with a transparent plastic protective sheet.

BRIEF DESCRIPTION OF THE DRAWING

FIG. 1. - Individual components of the pocket filter card

FIG. 2. - Cross section of an exploded view of the pocket filter card.

FIG. 3. - Fully assembled filter card housed in its protective paper envelope.

DESCRIPTION OF THE PREFERRED EMBODIMENTS

FIG. 1 shows the individual components of an unassembled pocket filter card. As illustrated in FIGS. 1 & 2 items 1 and 5 are transparent plastic protective laminates used to bond and protect the filter card. They measure 3¼ inches by 5¼ inches in size. The transparent laminates have eight ¾ inch holes pre-cut to allow for a distortion free viewports through the colored acetate filters. Items 2 and 4, illustrated in FIGS. 1 & 2, are pre-printed and pre-cut from 67 lbs. card stock measuring 3 inches by 5 inches. Eight ¾ inch holes are placed in alignment with the pre-cut holes in the transparent plastic protective covering illustrated as items 1 and 5 in FIGS. 1 & 2. The face and back cards (items 2 and 4) supply rigidity to the card. They securely house the colored acetate filters, and are a medium to print and display the product name. Item number 3 is formed by eight one-inch-square transparent colored acetate filters in the most popular colors used by amateur astronomers in viewing celestial objects. The filters are aligned to fit in the pre-cut ¾ inch holes through the transparent plastic protective sheet and the face and back cards as shown in FIGS. 1 and 2. FIG. 2 is a schematic cross section view of an exploded pocket filter card. This view shows how the components of the pocket filter card are stacked one on top of the other in a sandwich manner, laminated to form a card. FIG. 1 also illustrates the assembly process of the pocket filter card. This exploded view illustrates how item 3, the clear colored acetate filters, are sandwiched between items 2 & 4, the face and back cards, which in turn are sandwiched between 1 & 5, the clear plastic protective laminate sheets, to form the over-the-eye-piece pocket filter card. FIG. 3 shows a fully assembled over-the-eyepiece pocket filter card partially housed in a protective paper envelope. The envelope is used to store, carry, and protect the pocket filter card when not in use. The paper envelope is also used to print and display the product name and logo.

I claim:

1. An over-the-eyepiece pocket filter card for use by astronomers comprising:

a filter sheeting containing eight equal colored clear acetate filters;

a face card and a back card securely adhering the filter sheeting therebetween, said face and back cards, each having a dimension of 3 inches by 5 inches, which totally covers the filter sheeting, and having eight pre-cut ¾ inch holes regularly distributed thereon to respectively fit over the eight colored clear acetate filters; and a laminated transparent protective plastic sheeting totally covering the face and back cards, said plastic sheeting having eight pre-cut ¾ inch holes in respective alignments with the eight pre-cut ¾ inch holes of the face and back cards.

* * * * *